United States Patent [19]
Steckle

[11] 3,854,387
[45] Dec. 17, 1974

[54] SAFETY SNUBBER FOR COUNTERWEIGHT

[75] Inventor: Steckle, Charles, McCandless Twp., Allegheny County, Pa.

[73] Assignee: United States Steel Corporation, Pittsburgh, Pa.

[22] Filed: July 11, 1973

[21] Appl. No.: 378,369

[52] U.S. Cl. ............... 98/59, 16/1, 126/299 A, 188/313, 188/322
[51] Int. Cl. ............................ F23l 17/02
[58] Field of Search ....... 98/59; 126/299 A; 49/322; 110/163; 52/66, 19, 192, 198; 16/1, 51, 52; 248/364; 188/313, 313, 318, 322

[56] References Cited
UNITED STATES PATENTS

| 2,880,963 | 4/1959 | Ernst et al. .................... 188/313 |
| 3,123,028 | 3/1964 | Bodeker ......................... 110/163 |
| 3,190,635 | 6/1965 | Wustenhagen et al. ........... 188/316 |
| 3,523,499 | 8/1970 | Bauerschmidt .................... 98/59 |
| 3,545,365 | 12/1970 | Snader ............................ 98/59 |
| 3,667,260 | 6/1972 | Foote ............................. 98/59 |
| 3,682,461 | 8/1972 | Wachenheim ................... 188/322 |
| 3,722,640 | 3/1973 | Taylor ........................... 188/316 |

Primary Examiner—William E. Wayner
Assistant Examiner—W. E. Tapolcai, Jr.
Attorney, Agent, or Firm—Rea C. Helm

[57] ABSTRACT

A safety snubber for a counterweight has a rod extending from the bottom of the counterweight to a piston loosely fitted inside a cylinder filled with a fluid. In the event the support for the counterweight fails the weight of the counterweight forces the piston downward. Descent is controlled by the piston forcing fluid through a bypass connected to the upper and lower parts of the cylinder and beyond the lower bypass connection by passage of fluid in the space between the piston and the cylinder. An open hollow cylinder of flexible material in the bottom of the piston-containing cylinder stops the final descent.

4 Claims, 2 Drawing Figures

3,854,387
FIG. 1.
FIG. 2.
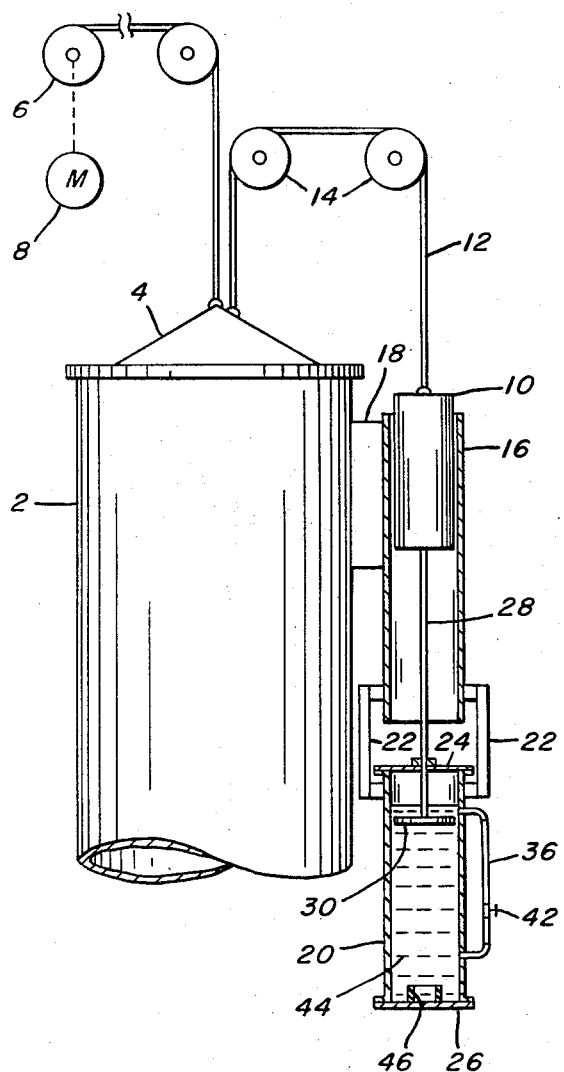
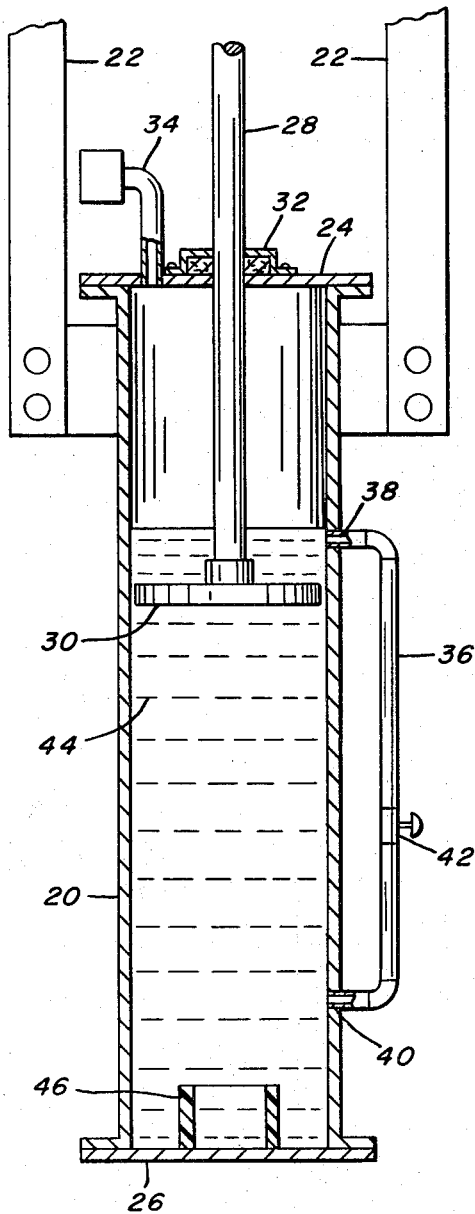

SAFETY SNUBBER FOR COUNTERWEIGHT

BACKGROUND OF THE INVENTION

This invention relates to a safety snubber for a counterweight and more particularly to apparatus for reducing the impact of a counterweight to a very low value which can be safely absorbed by adjacent support members.

Some basic oxygen steel-making shops include an emergency stack connected to the exhaust gas collection system. The stack is normally closed by a cap but is opened in the event of a failure in the exhaust gas collection system. The cap is removed from the top of the stack by a hoist, and since the cap is heavy, the cap conveniently has a counterweight. Since the whole mechanism is located on the top of a tall stack, failure of the support for the counterweight presents a hazard to the personnel and equipment below.

According to my invention, the counterweight, moving in a guide attached to the top of stack, is connected to a piston which moves in a cylinder containing a fluid. In the event the counterweight support cable fails the weight of the counterweight forces the piston downward. The fluid resists the downward movement, first through a controlled bypass, which allows for normal movement of the piston and then through passage in the gap between the piston and cylinder wall. An open hollow cylinder of flexible material in the bottom of the cylinder stops the final descent of the piston.

It is therefore an object of my invention to provide apparatus to stop the motion of a counterweight upon the failure of its support.

Another object is to provide snubbing apparatus for a counterweight that will not interfere with the normal operation of the counterweight.

A further object is to provide snubbing apparatus which reduces the impact forces to a very low value.

These and other objects will become more apparent after referring of the following specification and drawings in which FIG. 1 is an elevational view, partially in section, of the top of a stack, a cap valve and counterweight attached to the safety snubber of my invention and FIG. 2 is elevational view, partially in section, showing the details of the safety snubber of my invention.

Referring now to the drawings, reference numeral 2 indicates the upper end of a tall stack which may be the emergency stack of a basic oxygen furnace exhaust gas collection system. Stack 2 has a cap 4 which is opened and closed by a hoist 6 driven by a motor 8. Cap 4 is relatively heavy and has a counterweight 10 attached to cap 4 by a cable 12 passing over sheaves 14. Counterweight 10 moves in a cylindrical guide 16 which is attached to the top of stack 2 by a bracket 18. This is a conventional cap valve with a counterweight.

The safety snubber of my invention includes a cylinder 20 suspended by brackets 22 from the bottom of guide 16. Cylinder 20 has a top plate 24 and a bottom plate 26. A piston rod 28 connects counterweight 10 to a piston 30 loosely fitted for movement in cylinder 20 when counterweight 10 is moved. Piston rod 28 moves through top plate 24 through a dust seal 32 which prevents foreign material from entering the inside of cylinder 20 around rod 28. A filtered vent 34 permits breathing action caused by changes of volume within cylinder 20 as rod 28 is extended and retracted. A bypass line 36 has an upper connection 38 to the cylinder and a lower connection 40 connection to the cylinder. A control valve 42 is located in line 36. Cylinder 20 is filled with a fluid 44. At the lower end of cylinder 20, and resting on bottom plate 26, is a smaller cylinder 46 which is made of flexible material impervious to deterioration by fluid 44. Cylinder 46 may be a short length of neoprene hose which is immersed in a hydraulic fluid 44.

In the normal operation of cap valve 4, counterweight 10 will rise and fall. Valve 42 is set to permit the flow of fluid through the bypass sufficient to permit free travel of piston as cap valve 4 is opened and closed. Normal movement of piston 30 in opening and closing cap valve 4 is between upper connection 38 and lower connection 40. The usual position of counterweight 10 and piston 30 is the uppermost position as shown in the drawings.

In the event that cable 12 fails when counterbalance 10 is in the uppermost position, the descent of the counterweight will by controlled by the rate at which displaced fluid can flow through bypass 36. This provides some braking effect, depending upon the setting of valve 42, to partially control the descent. Beyond the lower connection 40, the rate of descent is controlled by the rate at which fluid can move through the space between the loose fitting piston 30 and the inner walls of cylinder 20. Near the extreme end of the downward movement, piston 30 will contact hollow cylinder 46 which is filled with fluid 44. Cylinder 46 finally stops the descent of counterbalance 10 and piston 30. The energy of finally stopping the descent of piston 30 and counterweight 10 will be absorbed by the resulting compression of cylinder 46 combined with the radial expansion of cylinder 46 caused by the entrapped fluid. The rate of energy absorption will be a function of the length, diameter, wall thickness and resilience of wall material of cylinder 46.

From the foregoing description, it is seen that my invention provides a safety snubber that reduces the impact forces resulting from stopping a falling weight to a very low value which can readily be absorbed by adjacent support members.

While only a single embodiment of my invention has been shown and described, it is apparent that other modifications and adaptions may be made.

I claim:

1. In a combination which includes a stack, a cap normally closing the upper end of said stack, lifting means connected to said cap for raising the cap from the stack, a counterweight mounted on said stack and support means connecting said counterweight to said cap whereby said counterweight assists said lifting means in raising said cap, the combination therewith comprising a hollow cylinder closed on one end and mounted on the stack, a piston loosely fitting inside said cylinder, means connecting the counterweight to said piston for moving said piston as the counterweight descends, a by-pass line connected to said cylinder providing a passageway to the cylinder interior between a location near the closed end of the cylinder and another location near the outer end of the cylinder and a fluid in said cylinder whereby descent of the counterweight is controlled by the rate of flow of said fluid through said bypass line as said piston moves between the bypass connections and by the rate of flow of said fluid between said piston and the wall of said cylinder as said piston moves towards the closed end of said cylinder.

2. A combination according to claim 1 in which said snubbing means includes energy absorbing means mounted inside said cylinder on the closed end for stopping the descent of the counterweight.

3. A combination according to claim 2 in which said energy absorbing means is a hollow cylinder of flexible material whereby when said piston moves into contact with said flexible cylinder said piston compresses said flexible cylinder and entraps fluid therein which radially expands said flexible cylinder.

4. A combination according to claim 3 in which the normal movement of the counterweight moves said piston between the bypass line connections and which includes a control valve in said bypass line for adjusting the fluid flow in said bypass line to provide for normal movement of the counterweight.

* * * * *